United States Patent [19]

Feindel

[11] Patent Number: 5,213,175

[45] Date of Patent: May 25, 1993

[54] REDUCED LENGTH RACK AND PINION STEERING ASSEMBLY

[75] Inventor: Robert E. Feindel, Sterling Heights, Mich.

[73] Assignee: TRW Inc., Lyndhurst, Ohio

[21] Appl. No.: 703,206

[22] Filed: May 20, 1991

[51] Int. Cl.$^5$ .............................................. B62D 5/10
[52] U.S. Cl. .................................... 180/148; 180/155
[58] Field of Search ............... 180/132, 141, 148, 153, 180/154, 160, 162, 158, 155

[56] References Cited

U.S. PATENT DOCUMENTS

| | | | |
|---|---|---|---|
| 3,037,485 | 6/1962 | Adams | 92/136 |
| 3,951,045 | 4/1976 | Frei et al. | 180/155 X |
| 4,418,781 | 12/1983 | Rabe et al. | 180/155 |
| 4,599,911 | 7/1986 | Rosell | 74/388 PS |
| 4,608,876 | 9/1986 | Rosell | 74/388 PS |
| 4,629,026 | 12/1986 | Rosell | 180/148 |
| 4,828,068 | 5/1989 | Wendler et al. | 180/148 |
| 4,940,104 | 7/1990 | Hasegawa | 180/132 |

Primary Examiner—Russell D. Stormer
Assistant Examiner—Joseph D. Pape
Attorney, Agent, or Firm—Tarolli, Sundheim & Covell

[57] ABSTRACT

A hydraulic rack and pinion steering assembly comprises an elongate rack bar having opposite ends connectable with a pair of steerable vehicle wheels, and having rack teeth in meshing engagement with a pinion. The assembly further comprises an inner sleeve, an outer sleeve extending over the inner sleeve, and a piston tube supported for longitudinal movement telescopically between the inner and outer sleeves. A piston is fixed to the piston tube for movement with the piston tube between the inner and outer sleeves. The rack bar extends through the inner sleeve, and is connected to the piston tube to move with the piston tube relative to the inner and outer sleeves. First and second variable volume hydraulic chambers have first and second movable end walls. The effective piston surface area defined by the first movable end wall is equal to the effective piston surface area defined by the second movable end wall.

6 Claims, 5 Drawing Sheets

REDUCED LENGTH RACK AND PINION STEERING ASSEMBLY

FIELD OF THE INVENTION

The present invention relates to a hydraulic rack and pinion steering assembly for steering a pair of steerable vehicle wheels.

BACKGROUND OF THE INVENTION

U.S. Pat. No. 4,828,068 discloses a hydraulic rack and pinion steering assembly for steering a pair of steerable vehicle wheels. The assembly includes an elongate rack supported for longitudinal movement. The rack has opposite ends connected with the pair of steerable vehicle wheels, and has rack teeth in meshing engagement with a pinion. A hydraulic motor moves the rack longitudinally to effect steering movement of the vehicle wheels. The hydraulic motor has a pair of stationary end walls fixed to the interior of a housing through which the rack extends, and has a movable piston fixed to the rack for movement between the stationary end walls. When the rack is in a centered position, the rack teeth are spaced axially from the adjacent stationary end wall of the hydraulic motor so that the rack teeth remain outside the hydraulic motor when the rack moves. The rack thus has a total length defined in part by a portion of the rack that extends axially between the rack teeth and the hydraulic motor when the rack is in a centered position.

U.S. Pat. No. 3,951,045 discloses a hydraulic rack and pinion steering assembly including a rack which is shorter, in relative terms, than the rack disclosed in the '068 patent. The rack disclosed in the '045 patent moves longitudinally in opposite directions relative to a housing, and extends through a rack support tube which is fixed to the housing. A piston tube is movable telescopically between the rack support tube and an outer cylindrical tube, and is connected to the rack for movement with the rack. A piston is fixed to the piston tube for movement with the piston tube between the rack support tube and the outer cylindrical tube. A first variable volume hydraulic chamber is defined between the cylindrical tube and the piston tube on one side of the piston, and a second variable volume hydraulic chamber is defined between the cylindrical tube and the rack support tube on the other side of the piston. When the rack is in a centered position, the rack teeth within the rack support tube overlap axially with the adjacent hydraulic chamber. The rack does not have a portion that extends axially between the rack teeth and the hydraulic motor, and thus is shorter, in relative terms, than the rack disclosed in the '068 patent.

The structure of the steering assembly disclosed in the '045 patent enables the rack to be relatively shorter, but causes an imbalance in the hydraulic system. The tubular wall of the piston tube occupies space radially between the rack support tube and the cylindrical tube. The first hydraulic chamber is therefore narrower in the radial direction than the second hydraulic chamber. The surface area of the piston facing the first hydraulic chamber is consequently less than the surface area of the piston facing the second hydraulic chamber. The unequal surface areas of the piston facing the first and second hydraulic chambers are the effective piston surface areas against which hydraulic fluid pressure acts to move the piston. The hydraulic system is inherently imbalanced because the effective piston surface areas are inherently unequal.

SUMMARY OF THE INVENTION

In accordance with the present invention, a hydraulic rack and pinion steering assembly comprises an elongate rack bar having opposite ends connectable with a pair of steerable vehicle wheels, and having rack teeth in meshing engagement with a pinion. The assembly further comprises an inner sleeve, an outer sleeve extending over the inner sleeve, and a piston tube supported for longitudinal movement telescopically between the inner and outer sleeves. A hydraulic motor has a piston fixed to the piston tube for movement with the piston tube between the inner and outer sleeves. The rack bar extends in the inner sleeve and in the piston tube. The rack bar is connected to the piston tube to move longitudinally through the inner sleeve upon longitudinal movement of the piston tube telescopically between the inner and outer sleeves.

An input shaft in a housing rotates in response to steering input of a vehicle occupant, and a hydraulic control valve in the housing responds to relative rotation of the input shaft and the pinion. The hydraulic motor responds to the valve and moves the piston, and thus moves the piston tube and the rack bar longitudinally to effect steering movement of the steerable vehicle wheels. The hydraulic motor comprises first and second variable volume hydraulic chambers with respective first and second movable end walls. Each movable end wall has a surface defining the effective piston surface area of the respective hydraulic chamber. The effective piston surface area of the first hydraulic chamber is equal to the effective piston surface area of the second hydraulic chamber.

In a preferred embodiment of the invention, the first hydraulic chamber is defined in the outer sleeve on one axial side of the piston, and extends radially from the piston tube to the outer sleeve. The second hydraulic chamber is defined in the piston tube on one axial side of a seal supported by the inner sleeve, and extends radially from the piston tube to the rack bar. The effective piston surface area of the first hydraulic chamber is defined by an annular surface of the piston. The effective piston surface area of the second hydraulic chamber is defined by an annular surface on an end wall of the piston tube. The effective piston surface areas are equal in accordance with the invention because the first and second hydraulic chambers do not have an inherent size difference resulting from the tubular wall of the piston tube. Additionally, the rack bar does not have a portion extending axially between the rack teeth and the hydraulic motor when the rack bar is in a centered position. The invention thus enables the steering assembly to have both a relatively short rack bar and a balanced hydraulic system.

BRIEF DESCRIPTION OF THE DRAWINGS

The present invention will become apparent to those skilled in the art to which the invention relates upon reading the following description of a preferred embodiment of the invention in view of the accompanying drawings, wherein.

DESCRIPTION OF A PREFERRED EMBODIMENT

Figure 1:
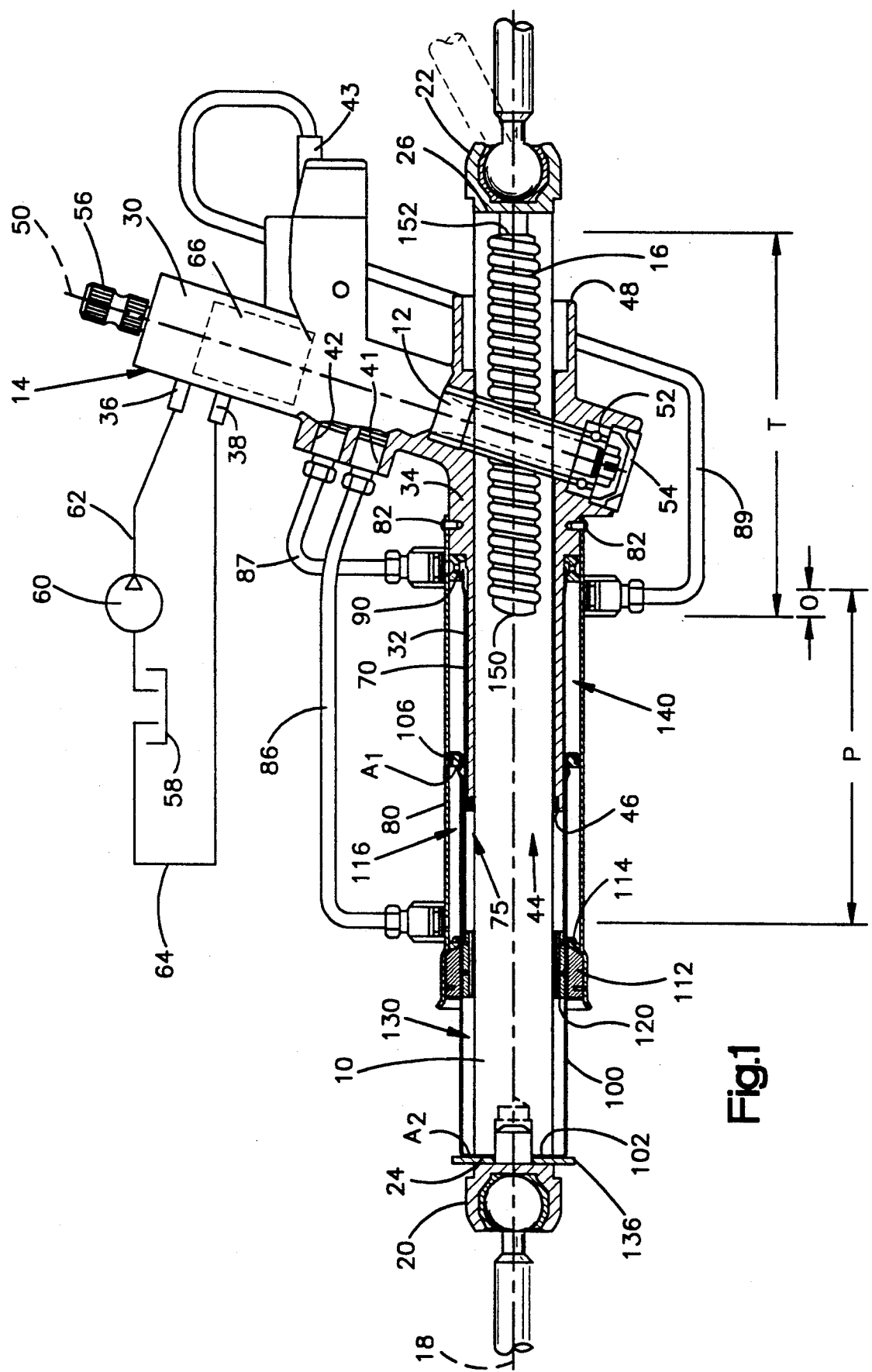
FIG. 1 is a sectional view of a hydraulic rack and pinion steering assembly constructed in accordance with a preferred embodiment of the present invention.

As shown in FIG. 1, a hydraulic rack and pinion power steering assembly constructed in accordance with the present invention comprises an elongate rack bar 10 and a pinion 12 supported in a housing 14. The rack bar 10 has a plurality of rack teeth 16, and is movable relative to the housing 14 in opposite directions along a longitudinal axis 18. Ball joints 20 and 22 connect opposite ends 24 and 26 of the rack bar 10 to linkages (not shown) that connect with an associated pair of steerable vehicle wheels. The linkages cause pivoting movement of the steerable vehicle wheels upon longitudinal movement of the rack bar 10 in a known manner.

The rack bar 10 is preferably formed of SAE 1040 steel, cold drawn and annealed. The rack teeth 16 are cut from solid in a machining process known as broaching, and the rack bar 10 is induction hardened to a case depth of 1.5 mm. The pinion 12 is preferably formed of SAE 8115 steel, cold drawn and annealed. A pinion blank is machined from bar stock and gear teeth are cut in a hobbing operation. The pinion 12 is induction hardened to a case depth of 1.5 mm. Specifications for the ball joints 20 and 22 will vary depending on the application of the steering assembly.

Figure 4:
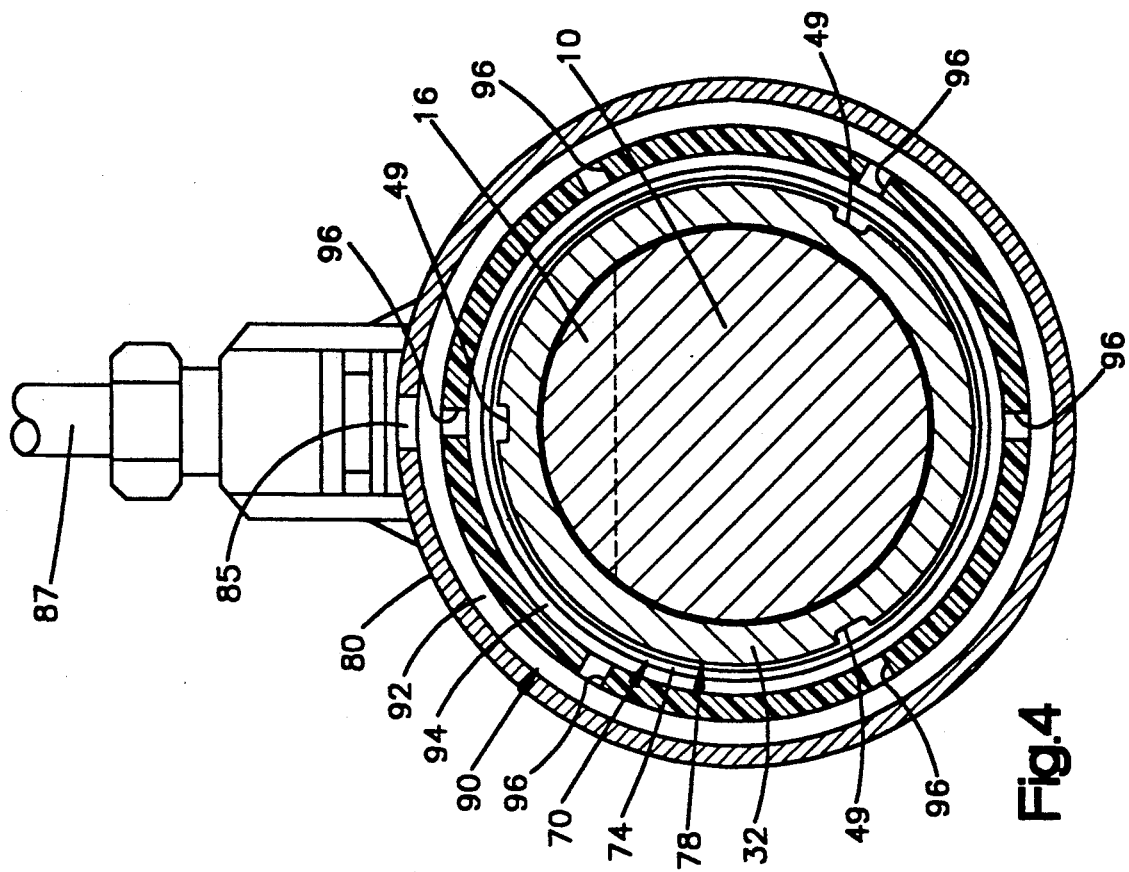
FIG. 4 is a view taken on line 4—4 of FIG. 2.
Figure 3:
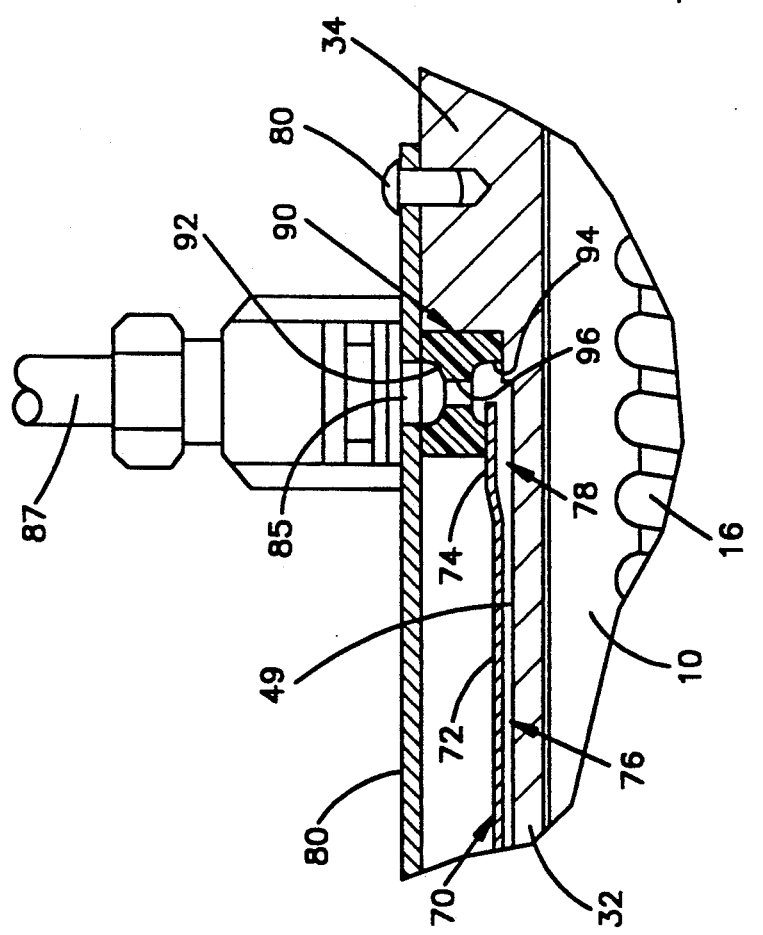

The housing 14 has an upper portion 30, a first cylindrical portion 32, and a second cylindrical portion 34. The upper portion 30 of the housing 14 has a hydraulic inlet 36 and a hydraulic outlet 38. The upper portion 30 also has first, second and third hydraulic ports 41, 42 and 43. An elongate passage 44 extends through the housing 14 between axially opposite ends 46 and 48 of the housing 14. The outer surface of the first cylindrical portion 32 defines a plurality of axially extending grooves 49, as best shown in FIGS. 3 and 4. The first cylindrical portion 32, the second cylindrical portion 34, and the passage 44 are centered on the longitudinal axis 18.

The housing 14 is preferably formed of die cast aluminum. A blank is formed in a die cast operation, and is then machine bored in various operations to take the shape shown in the figures.

The pinion 12 is supported in the housing 14 for rotation about a transverse axis 50 in meshing engagement with the rack teeth 16 on the rack bar 10. The lower end of the pinion 12 is supported in the housing 14 by a bearing 52 (preferably TRW part no. G-12-BB-1) and a cap 54 (preferably TRW part no. G-35-HB-3, formed of cold formed steel). An input shaft 56 in the upper portion 30 of the housing 14 is rotatable about the transverse axis 50 in response to rotation of a steering wheel (not shown) by a vehicle occupant. The input shaft 56 is connected with the pinion 12 so as to rotate slightly relative to the pinion 12 in response to steering torque. The input shaft 56 is preferably formed of SAE 1144 cold drawn steel, machined from bar stock, and induction hardened to a case depth of 1.0 mm.

The steering assembly further comprises a hydraulic reservoir 58, a pump 60, and associated hydraulic lines, as shown schematically in the figures. The pump 60 communicates with the hydraulic inlet 36 in the housing 14 through a hydraulic supply line 62. The reservoir 58 communicates with the hydraulic outlet 38 in the housing 14 through a hydraulic return line 64.

The specific make and model number for the reservoir 58 and for the pump 60 will vary depending upon the specific application, e.g., vehicle size, etc.

A hydraulic control valve 66 is located in the upper portion 30 of the housing 14, as shown schematically in the figures. The hydraulic control valve 66 responds to relative rotation between the input shaft 56 and the pinion 12 in a known manner. When the input shaft 56 rotates relative to the pinion 12 in a first direction, the hydraulic control valve 66 communicates the hydraulic inlet 36 in the housing 14 with the first hydraulic port 41, and communicates the hydraulic outlet 38 in the housing 14 with the second hydraulic port 42. Hydraulic fluid, preferably automatic transmission fluid, then flows under pressure from the pump 60 to the first hydraulic port 41 through the hydraulic control valve 66, and flows from the second hydraulic port 42 to the reservoir 58 through the hydraulic control valve 66. These flows of hydraulic fluid stop when relative rotation between the input shaft 56 and the pinion 12 stops.

When the input shaft 56 rotates relative to the pinion 12 in the opposite direction, the hydraulic control valve 66 similarly directs hydraulic fluid to flow in opposite directions from the pump 60 to the second hydraulic port 42, and from the first hydraulic port 41 to the reservoir 58. Hydraulic control valves for directing such flows of hydraulic fluid in a hydraulic rack and pinion power steering assembly are known in the art. For example, one such known hydraulic control valve is disclosed in U.S. Pat. No. 4,276,812. Preferably, a valve assembly such as TRW valve assembly no. G-30-VA-13-B1 including the pinion 12, the input shaft 56 and the hydraulic control valve 66 is used.

A cylindrical inner sleeve 70 is received coaxially over the first cylindrical portion 32 of the housing 14, and is fixed to the housing 14 by an interference fit, welds, or other suitable means. The inner sleeve 70 has an elongate major portion 72 and an inner end portion 74, as best shown in enlarged detail in FIGS. 2 and 3. The major portion 72 has an inside diameter equal to the outside diameter of the first cylindrical portion 32 of the housing 14. An annular space 75 is defined between the rack bar 10 and the major portion 72 of the inner sleeve 70. A plurality of longitudinal channels 76 are defined in the spaces between the grooves 49 and the major portion 72 of the inner sleeve 70.

Figure 2:
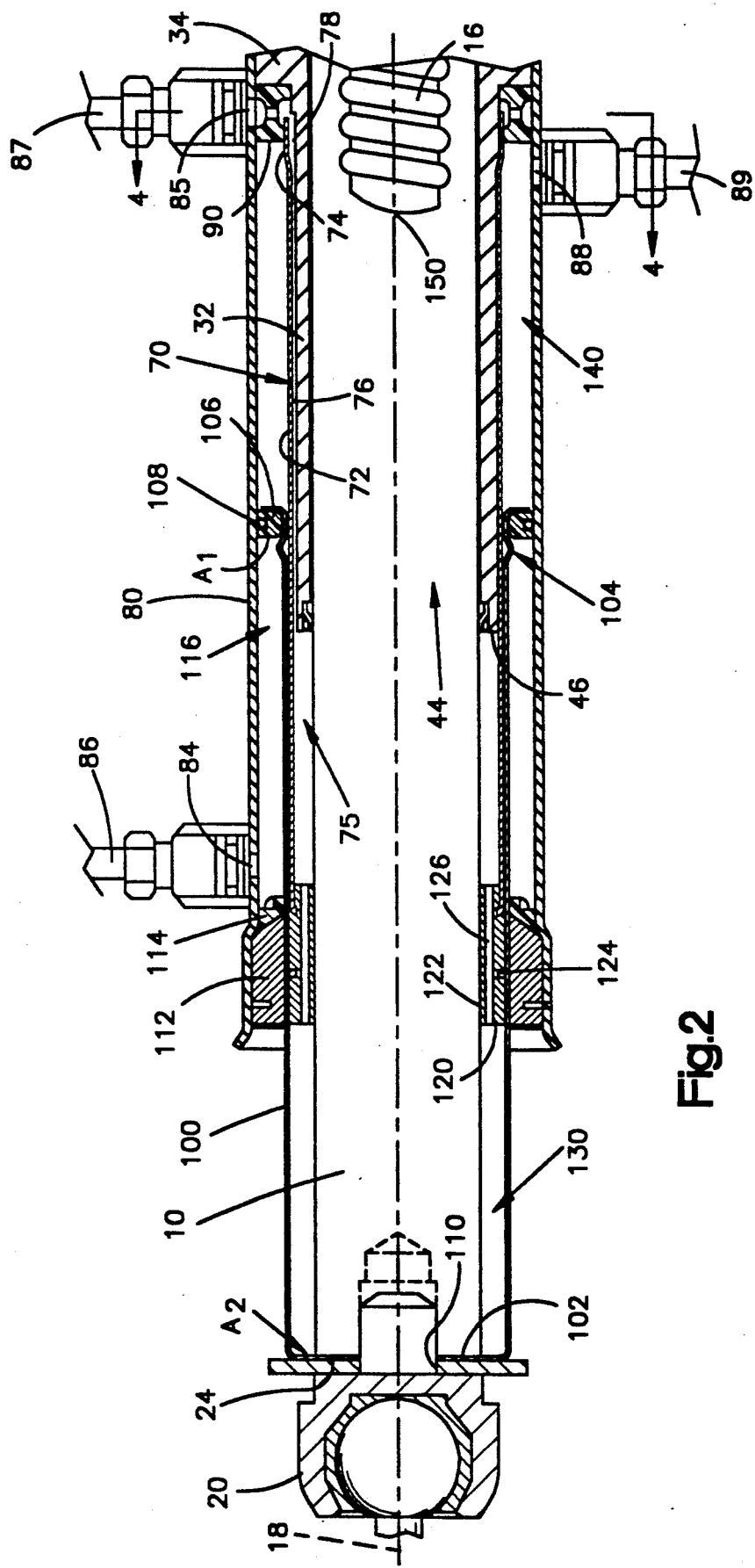
FIGS. 2 and 3 are enlarged partial views of the assembly of FIG. 1.

The inner end portion 74 of the inner sleeve 70 has a diameter which is greater than the diameter of the major portion 72. A circumferential channel 78 is defined in the space between the first cylindrical portion 32 of the housing 14 and the inner end portion 74 of the inner sleeve 70 (FIG. 2). The inner sleeve 70 is preferably formed of SAE 1020 cold rolled welded seam tubing, with the ends flanged and closed by rotating axially between rollers.

A cylindrical outer sleeve 80 is received coaxially over the second cylindrical portion 34 of the housing 14, and is fixed to the housing 14 by rivets 82. The outer sleeve 80 has first and second apertures 84 and 85 which communicate with the first and second hydraulic ports 41 and 42 in the housing 14 through first and second hydraulic lines 86 and 87, respectively. A third aperture 88 in the outer sleeve 80 communicates with the third hydraulic port 43 in the housing 14 through a third hydraulic line 89. The outer sleeve 80 is preferably formed of SAE 1020 cold rolled welded seam tubing, with the ends flanged and closed by rotating axially between rollers.

An annular static seal 90 extends around the inner end portion 74 of the inner sleeve 70. As best shown in FIG. 3, the static seal 90 has a circumferentially extending outer channel 92, a circumferentially extending inner channel 94, and a plurality of radially extending passages 96 communicating with the outer channel 92 with the inner channel 94. The second aperture 85 in the outer sleeve 80 communicates with the longitudinal channels 76 through the static seal 90 and the circumferential channel 78. The static seal 90 is preferably formed of nitryl (rubber).

A piston tube 100 is received coaxially over the inner sleeve 70. The piston tube 100 has an axially outer end wall 102 and an axially inner end portion 104. The axially inner end portion 104 of the piston tube 100 is engaged in sliding contact with the inner sleeve 70, and supports a piston 106 and a piston ring 108 in sliding contact with the outer sleeve 80. The piston tube 100 is thus supported for longitudinal movement telescopically between the inner and outer sleeves 70 and 80.

The piston tube 100 is preferably formed of SAE 1020 cold rolled welded seam tubing, with the ends flanged and closed by rotating axially between rollers. The piston 106 is preferably formed of SAE 1010 steel, machined from bar stock. The piston ring 108 is preferably formed of molded Teflon (trademark of E.I. DuPont de Nemours & Co.).

The end wall 102 of the piston tube 100 has an aperture 110 through which a threaded portion of the ball joint 20 extends into a threaded bore in the rack bar 10, and is clamped between the ball joint 20 and the end 24 of the rack bar 10. The rack bar 10 is thus connected to the piston tube 100 for longitudinal movement with the piston tube 100.

A sleeve support bushing 112 and an adjoining outer seal 114 are fixed to the outer sleeve 80 at locations axially outward of the first aperture 84. The sleeve support bushing 112 is preferably formed of SAE 8160 aluminum, machined from bar stock. The outer seal 114 is preferably formed of nitryl (rubber). A first variable volume hydraulic chamber 116 extends axially from the outer seal 114 to the piston 106, and extends radially from the piston tube 100 to the outer sleeve 80. The effective piston surface area of the first hydraulic chamber 116, which is the surface area upon which hydraulic fluid pressure acts to move the piston 106, is the surface area $A_1$ of the piston 106 facing the first hydraulic chamber 116.

A rack support bushing 120 is supported by the inner sleeve 70 at the axially outer end of the inner sleeve 70. The rack support bushing 120 has a central opening 122 through which the rack bar 10 slides, and supports a piston ring 124 over which the piston tube 100 slides between the sleeve support bushing 112 and the rack support bushing 120. A plurality of internal hydraulic fluid passages 126 extend axially through the rack support bushing 120. The rack support bushing 120 is preferably formed of SAE 8160 aluminum, machined from bar stock. The piston ring 124 is preferably formed of molded Teflon.

A second variable volume hydraulic chamber 130 extends axially from the rack support bushing 120 to the end wall 102 of the piston tube 100, and extends radially from the rack bar 10 to the piston tube 100. The rack support bushing 120 thus serves as an inner seal for the second chamber 130. The annular portion of the end wall 102 surrounding the rack bar 10 is a movable piston for the second hydraulic chamber 130. The effective piston surface area of the second hydraulic chamber 130, which is the surface area upon which hydraulic fluid pressure acts to move the end wall 102, is the surface area $A_2$ of the annular surface of the end wall 102 facing the second hydraulic chamber 130. The surface area $A_1$ is equal to the surface area $A_2$. The steering assembly thus has equal effective piston surface areas in the two hydraulic chambers 116 and 130, and is hydraulically balanced.

The second hydraulic chamber 130 communicates with the second aperture 85 in the outer sleeve 80 through the internal hydraulic fluid passages 126 in the rack support bushing 120, through the annular space 75 and the longitudinal channels 76, and further through the circumferential channel 78 and the static seal 90. A rack seal 132 blocks the hydraulic fluid from moving between the rack bar 10 and the first cylindrical portion 32 of the housing 14. The rack seal 132 is preferably formed of steel reinforced molded rubber.

During operation of the hydraulic rack and pinion steering assembly, the rack bar 10 is moved relative to the housing 14 in opposite directions along the longitudinal axis 18. The rack bar 10 has a centered position shown in FIG. 1, an extreme rightward position shown in FIG. 5, and an extreme leftward position shown in FIG. 6.

When the input shaft 56 rotates relative to the pinion 12 in one direction, the hydraulic control valve 66 in the housing 14 directs hydraulic fluid to flow under pressure from the pump 60 to the first hydraulic port 41 and the first hydraulic line 86, and simultaneously directs hydraulic fluid to flow from the second hydraulic port 42 and the second hydraulic line 87 to the reservoir 58. Hydraulic fluid then flows into the first hydraulic chamber 116 and out of the second hydraulic chamber 130. Such flows of hydraulic fluid move the piston 106, and in turn move the piston tube 100 and the rack bar 10, toward the extreme rightward position shown in FIG. 5. The pinion 12 rotates about the transverse axis 50 in meshing engagement with the rack teeth 16 upon movement of the rack bar 10 with the piston tube 100, and such flows of hydraulic fluid are stopped by the hydraulic control valve 66 when relative rotation between the input shaft 56 and the pinion 12 stops. Movement of the rack bar 10 and the piston tube 100 to the right is limited by a stop plate 136, as shown in FIG. 4.

Figure 6:
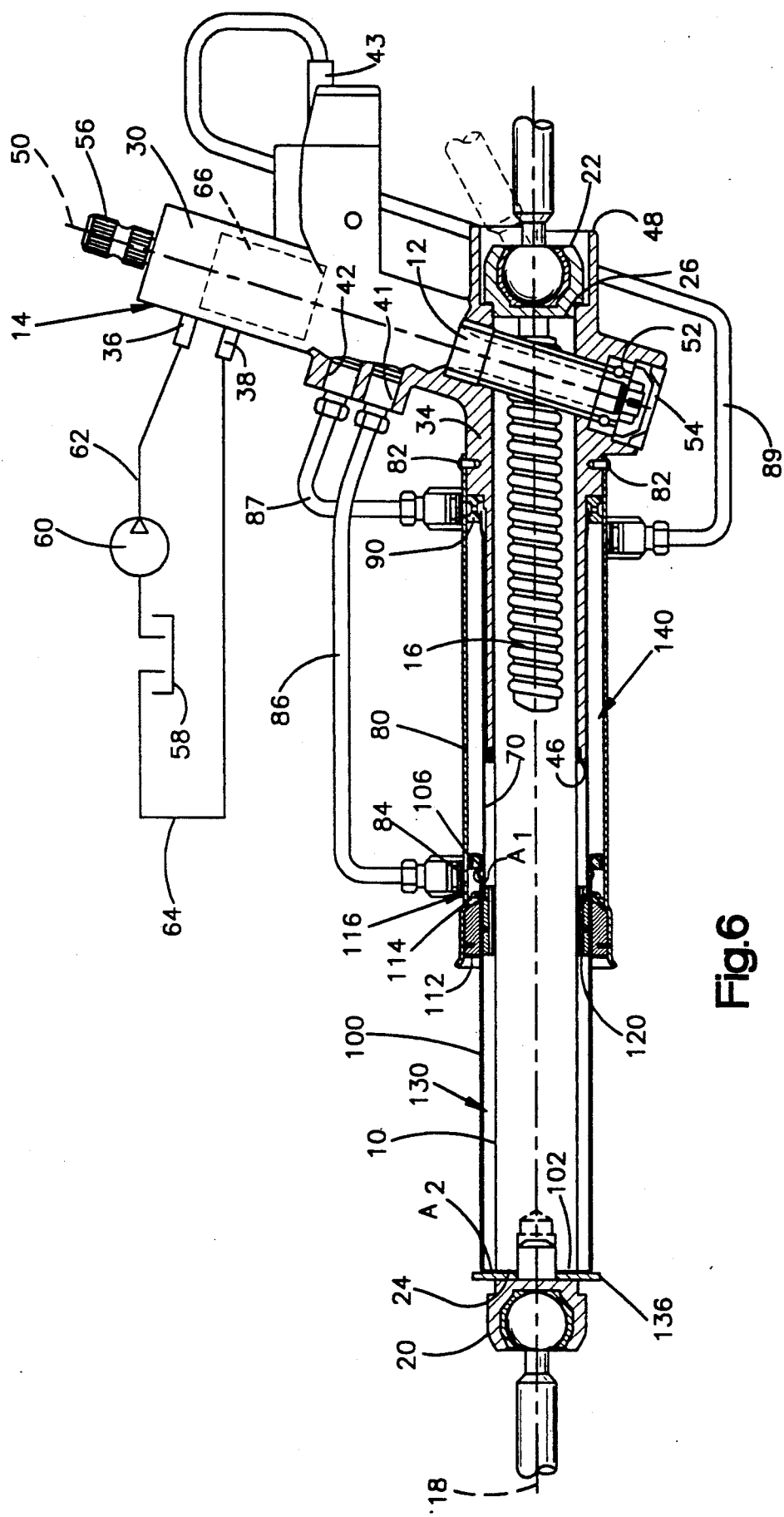

When the input shaft 56 rotates relative to the pinion 12 in the opposite direction, the hydraulic control valve 66 similarly directs hydraulic fluid to flow in opposite directions from the pump 60 to the second hydraulic line 87, and from the first hydraulic line 86 to the reservoir 58. Hydraulic fluid then flows into the second hydraulic chamber 130 and out of the first hydraulic chamber 116 to effect movement of the rack bar 10 toward the extreme leftward position shown in FIG. 6. Movement of the rack bar 10 and the piston tube 100 to the left is limited by contact of the ball joint 22 with the housing 14, as shown in FIG. 6.

Small quantities of hydraulic fluid could seep past the piston 106 and the piston ring 108 into the annular space 140 to the right of the piston 106. Such hydraulic fluid is directed by the hydraulic control valve 66 to flow from the third hydraulic line 89 to the reservoir 58 along with hydraulic fluid flowing to the reservoir 58 from the first or second hydraulic chamber 116 or 130.

As shown in FIG. 1, the rack teeth 16 extend along the rack bar 10 a distance T between axially spaced points 150 and 152. The distance T is approximately equal to the range of movement of the rack bar 10 along the longitudinal axis 18 between the extreme rightward and leftward positions shown in FIGS. 5 and 6. The piston 106 has a range of movement indicated by the dimension P shown in FIG. 1. When the rack bar 10 is in its centered position as shown in FIG. 1, the rack teeth 16 axially overlap the range of movement of the piston 106 in an amount indicated by the dimension 0. The axial distance between the piston 106 and the adjacent end 150 of the rack teeth 16 is thus minimized, and the overall length of the rack bar 10 is likewise minimized.

Figure 5:
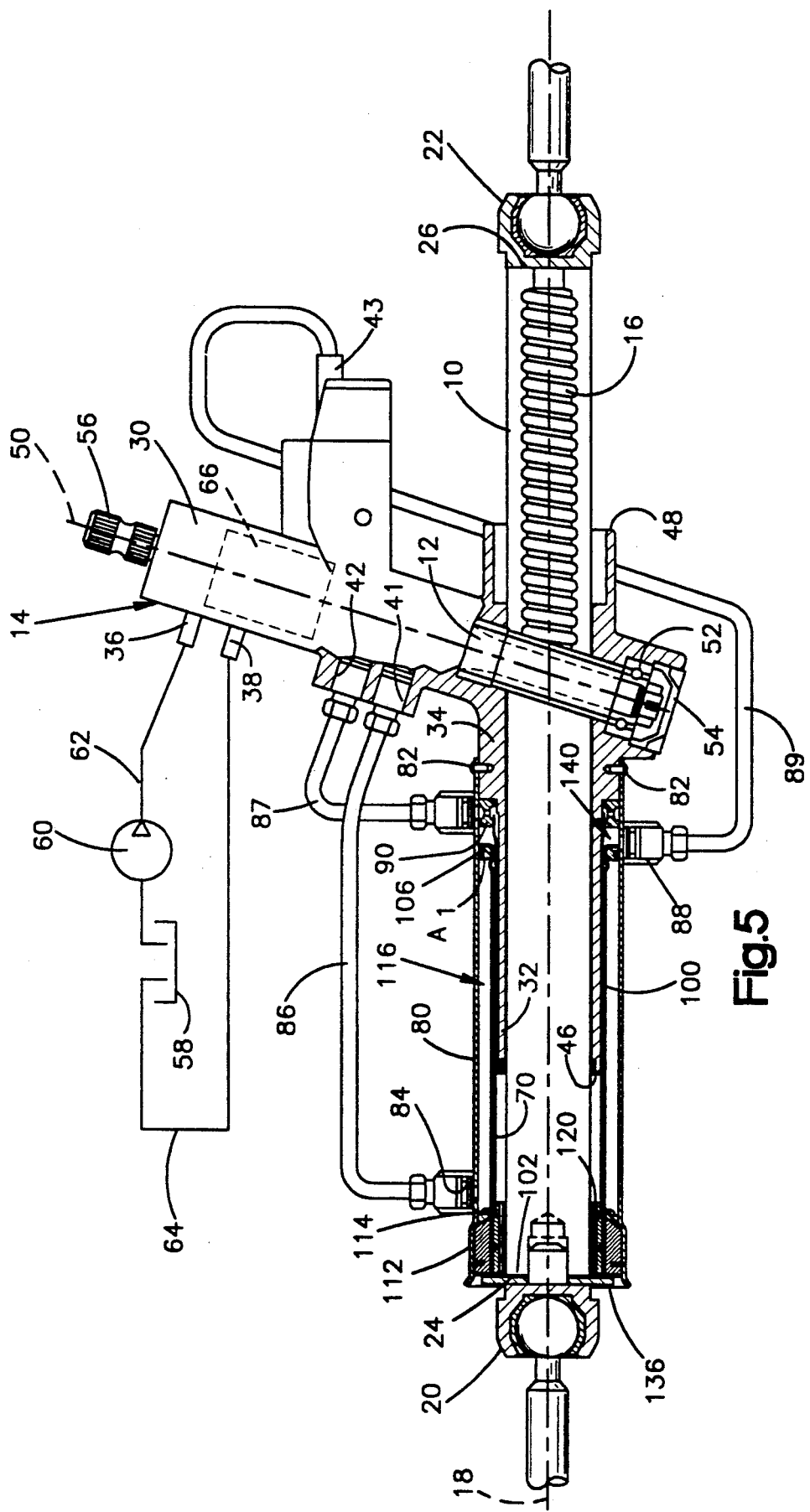
FIGS. 5 and 6 are views of the assembly of FIG. 1 showing parts in different positions.

Further in accordance with the invention, the ball joint 20 at the left end 24 of the rack bar 10 remains outside the outer sleeve 80, as shown in FIG. 5. The ball joint 22 at the right end 26 of the rack bar 10 moves into the housing 14 as shown in FIG. 6, but the adjacent end 48 of the housing 14 remains spaced from the maximum pivoted position of the shank portion of the ball joint 22. The steering assembly thus enables unrestricted tie rod articulation at opposite ends of the rack bar 10.

From the above description of the invention, those skilled in the art will perceive improvements, changes and modifications. Such improvements, changes and modifications are intended to be covered by the appended claims.

Having described the invention, the following is claimed:

1. A hydraulic rack and pinion steering assembly comprising:
   a housing;
   a pinion supported for rotation in said housing;
   an inner sleeve connected to said housing;
   an outer sleeve connected to said housing, said outer sleeve extending over said inner sleeve;
   a piston tube supported for telescopic movement between said inner and outer sleeves;
   an elongate rack bar having rack teeth in meshing engagement with said pinion, said rack bar extending through said inner sleeve and into said piston tube, said rack bar being connected to said piston tube to move with said piston tube relative to said inner and outer sleeves;
   a first variable volume hydraulic fluid chamber in said outer sleeve;
   a first piston surface means located in said first chamber, said first piston surface means being movable under the influence of hydraulic fluid pressure in said first chamber and being connected with said piston tube for said piston tube to move with said first piston surface means;
   a second variable volume hydraulic fluid chamber in said piston tube;
   a second piston surface means located in said second chamber, said second piston surface means being movable under the influence of hydraulic fluid pressure in said second chamber and being connected with said piston tube for said piston tube to move with said second piston surface means;
   said piston tube having an axis, said first chamber extending radially from said piston tube to said outer sleeve, said second chamber extending radially from said piston tube to said rack bar; and
   an inner seal fixed to said inner sleeve, said second chamber extending axially from said inner seal in a direction away from said first piston surface means.

2. An assembly as defined in claim 1 wherein said first piston surface means is located on a piston which is fixed to said piston tube for movement with said piston tube between said inner and outer sleeves, and further comprising an outer seal fixed to said outer sleeve, said first chamber extending axially from said outer seal to said piston.

3. An assembly as defined in claim 2 wherein said piston tube has an end wall, said second chamber extending axially from said inner seal to said end wall.

4. An assembly as defined in claim 3 wherein said piston and said end wall of said piston tube define equal effective piston surface areas respectively facing said first and second chambers.

5. A hydraulic rack and pinion steering assembly comprising:
   a housing;
   a pinion supported for rotation in said housing;
   an inner sleeve connected to said housing;
   an outer sleeve connected to said housing, said outer sleeve extending over said inner sleeve;
   a piston tube supported for telescopic movement between said inner and outer sleeves;
   an elongated rack bar having rack teeth in meshing engagement with said pinion, said rack bar extending through said inner sleeve and into said piston tube, said rack bar being connected to said piston tube to move with said piston tube relative to said inner and outer sleeves;
   a first variable volume hydraulic fluid chamber in said outer sleeve;
   a first piston surface means located in said first chamber, said first piston surface means being movable under the influence of hydraulic fluid pressure in said first chamber and being connected with said piston tube for said piston tube to move with said first piston surface means;
   a second variable volume hydraulic fluid chamber in said piston tube;
   a second piston surface means located in said second chamber, said second piston surface means being movable under the influence of hydraulic fluid pressure in said second chamber and being connected with said piston tube for said piston tube to move with said second piston surface means; and
   said piston tube having an axis, said first chamber extending radially from said piston tube to said outer sleeve, said second chamber extending radially from said piston tube to said rack bar.

6. A hydraulic power steering assembly comprising:
   a housing;
   an inner sleeve connected to said housing;
   an outer sleeve connected to said housing, said outer sleeve extending over said inner sleeve;
   a piston tube supported for telescopic movement between said inner and said outer sleeves;
   an elongate rack bar extending through said inner sleeve and into said piston tube, said rack bar being connected to said piston tube to move with said piston tube relative to said inner and outer sleeves;
   means for moving said piston tube telescopically between said sleeves in a first direction, including a first variable volume hydraulic fluid chamber, and a first movable piston surface means located in said first chamber, said first movable piston surface means having a total piston surface area upon which hydraulic fluid pressure acts in said first direction in said first chamber, said first movable piston surface means being connected with said piston tube to move said piston tube in said first direction under the influence of said hydraulic fluid pressure acting in said first direction;

means for moving said piston tube telescopically between said sleeves in a second direction, including a second variable volume hydraulic fluid chamber and a second movable piston surface means located in said second chamber, said second movable piston surface means having a total piston surface area upon which hydraulic fluid pressure acts in said second direction in said second chamber, said second movable piston surface means being connected with said piston tube to move said piston tube in said second direction under the influence of said hydraulic fluid pressure acting in said second direction; and said total piston surface area of said first movable piston surface means being equal to said total piston surface area of said second movable piston surface means.

* * * * *